No. 742,845. Patented November 3, 1903.

UNITED STATES PATENT OFFICE.

OSCAR DRESSEL, OF ELBERFELD, GERMANY, ASSIGNOR TO FARBENFABRIKEN OF ELBERFELD CO., OF NEW YORK, N. Y., A CORPORATION OF NEW YORK.

1-ACETYLAMIDO-2-4-DIAMIDOBENZENE.

SPECIFICATION forming part of Letters Patent No. 742,845, dated November 3, 1903.

Application filed April 2, 1903. Serial No. 150,763. (No specimens.)

*To all whom it may concern:*

Be it known that I, OSCAR DRESSEL, doctor of philosophy, chemist, (assignor to the FARBENFABRIKEN OF ELBERFELD COMPANY, of New York,) residing at Elberfeld, Germany, have invented a new and useful Improvement in 1-Acetylamido-2-4-Diamidobenzene; and I declare hereby the following to be a clear and exact description of my invention.

My invention relates to the production of the hitherto-unknown 1-acetylamido-2-4-diamidobenzene having the formula:

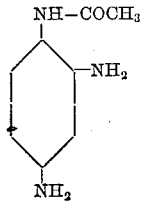

The process for producing this body consists in treating 1-acetylamido-2-4-dinitrobenzene with such reducing agents as act in a moderate manner—*e. g.*, iron filings and dilute acetic acid or iron filings and small quantities of mineral acids or the like.

In carrying out the process practically I can proceed as follows, the parts being by weight: 22.5 parts of pulverized 2-4-dinitroacetanilid are stirred into a hot mixture of sixty parts of iron filings, from two hundred to three hundred parts of water, and of 1.5 parts of acetic acid, (thirty per cent.) The reaction begins at once and is terminated by further heating the mixture for some time. It is rendered alkaline by the addition of sodium carbonate. The hot reaction liquid is filtered, and the residue on the filter is washed with hot water. From the partially-evaporated cool filtered solution the 1-acetylamido-2-4-diamidobenzene separates. It is filtered off and recrystallized from alcohol, (eighty per cent.) The new compound thus obtained is a white crystalline powder melting at from 158° to 159° centigrade. It is soluble in water and less soluble in alcohol and benzene. On boiling it with glacial acetic acid it is transformed into amidomethylbenzimidazol having the known properties.

Having now described my invention and in what manner the same is to be performed, what I claim as new, and desire to secure by Letters Patent, is—

The herein-described new 1-acetylamido-2-4-diamidobenzene being a white crystalline powder melting at from 158° to 159° centigrade, soluble in water and less soluble in alcohol and benzene, and being transformed into amidomethylbenzimidazol on being boiled with glacial acetic acid, substantially as hereinbefore described.

In testimony whereof I have signed my name in the presence of two subscribing witnesses.

OSCAR DRESSEL.

Witnesses:
OTTO KÖING,
ALBERT HEMSING.